(12) United States Patent
Hatori et al.

(10) Patent No.: US 7,880,620 B2
(45) Date of Patent: Feb. 1, 2011

(54) RFID TAG AND CONSTRUCTION SITE MANAGEMENT SYSTEM AND MANAGEMENT METHOD USING THE SAME

(75) Inventors: Fumio Hatori, Tokyo (JP); Shinichi Ebata, Tokyo (JP); Sumito Maezawa, Tokyo (JP); Masayuki Hosokawa, Tokyo (JP); Masashi Hashimoto, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 362 days.

(21) Appl. No.: 11/958,121

(22) Filed: Dec. 17, 2007

(65) Prior Publication Data

US 2008/0150727 A1 Jun. 26, 2008

(30) Foreign Application Priority Data

Dec. 20, 2006 (JP) ............................. 2006-343211

(51) Int. Cl.
*G08B 13/14* (2006.01)

(52) U.S. Cl. .............. 340/572.7; 340/572.8; 340/572.1; 340/539.13; 235/385; 235/382; 235/439; 235/451

(58) Field of Classification Search .............. 340/572.8, 340/572.7, 539.26, 572.1, 539.13, 825.49, 340/5.92, 10.4; 235/492, 385, 439, 383, 235/382, 449, 493; 343/893; 455/39

See application file for complete search history.

(56) References Cited

U.S. PATENT DOCUMENTS

| | | | | |
|---|---|---|---|---|
| 7,159,654 | B2 * | 1/2007 | Ellison et al. | 166/250.01 |
| 7,168,619 | B2 * | 1/2007 | Heusermann et al. | 235/385 |
| 7,374,105 | B2 * | 5/2008 | Zhu et al. | 235/492 |
| 7,389,922 | B2 * | 6/2008 | Yoshimura et al. | 235/385 |
| 2003/0141590 | A1 * | 7/2003 | Kamiya et al. | 257/730 |
| 2004/0217864 | A1 * | 11/2004 | Nowak et al. | 340/572.1 |
| 2005/0242957 | A1 * | 11/2005 | Lindsay et al. | 340/572.7 |
| 2005/0258966 | A1 * | 11/2005 | Quan | 340/572.7 |
| 2007/0159339 | A1 * | 7/2007 | Matsuura et al. | 340/572.8 |
| 2007/0222610 | A1 * | 9/2007 | Tagato | 340/572.7 |
| 2008/0084333 | A1 * | 4/2008 | Forrest et al. | 340/989 |

FOREIGN PATENT DOCUMENTS

JP 2005-326965 A 11/2005

* cited by examiner

*Primary Examiner*—George A Bugg
*Assistant Examiner*—Hoi C Lau
(74) *Attorney, Agent, or Firm*—Roberts Mlotkowski Safran & Cole, P.C.; David S. Safran

(57) ABSTRACT

According to an aspect of the present invention, an RFID tag has a long-distance communication RFID and a plurality of short-distance communication RFIDs. The RFID tag has tear-off lines for separating the short-distance communication RFID from the whole RFID tag, and when the short-distance communication RFID is separated, a loop-shaped antenna of the long-distance communication RFID is also cut up. And the RFID tag has an overall management identification code for identifying the whole tag before separation and a partial management identification code for identifying a partial tag after separation.

7 Claims, 10 Drawing Sheets

FIG.6

PRODUCT INFORMATION FILE

| OVERALL MANAGEMENT RFID CODE | PRODUCT NUMBER | FACTORY SHIPMENT NUMBER | SYSTEM NAME | BUILDING NAME | AREA NUMBER | ... |
|---|---|---|---|---|---|---|
| A0000100001 | P11-2011-R001 | K001 | CIRCULATING WATER SYSTEM | TURBINE | T3B1345 | .. |
| A0000100002 | P12-0044-R032 | K001 | MAIN STEAM SYSTEM | TURBINE | T3B1300 | .. |
| A0000100003 | P11-2012-R004 | K001 | CONDENSING SYSTEM | TURBINE | T3B1524 | .. |
| A0000100004 | P31-2055-R099 | K001 | STEAM SYSTEM | TURBINE | T3B1300 | .. |
| A0000100005 | P11-1001-R005 | K002 | REHEATING SYSTEM | R/B | R1B0325 | .. |
| A0000100006 | P14-1235-R004 | K002 | MAIN STEAM SYSTEM | R/B | R1B0333 | .. |
| A0000100007 | P65-1035-R009 | K003 | CIRCULATING WATER SYSTEM | TURBINE | T1B0012 | .. |
| .. | .. | .. | .. | .. | .. | .. |

FIG.7

PRODUCT MANAGEMENT INFORMATION FILE

| OVERALL MANAGEMENT RFID CODE | PRODUCT NUMBER | FACTORY PROGRESS | SHIPPER'S ID | DELIVERY TO SITE | PROVISIONAL STORAGE AREA | ·· |
|---|---|---|---|---|---|---|
| A00000100001 | P11-2011-R001 | SHIPPED | 6120 | DELIVERED | A-11 | ·· |
| A00000100002 | P12-0044-R032 | SHIPPED | 6120 | DELIVERED | A-11 | ·· |
| A00000100003 | P11-2012-R004 | SHIPPED | 6120 | DELIVERED | A-11 | ·· |
| A00000100004 | P31-2055-R099 | SHIPPED | 6120 | CHECKING IN PROGRESS | B-05 | ·· |
| A00000100005 | P11-1001-R005 | IN PREPARATION FOR SHIPMENT | | | | ·· |
| A00000100006 | P14-1235-R004 | IN PREPARATION FOR SHIPMENT | | | | ·· |
| A00000100007 | P65-1035-R009 | IN PRODUCTION | | | | ·· |
| ·· | ·· | ·· | | | | ·· |

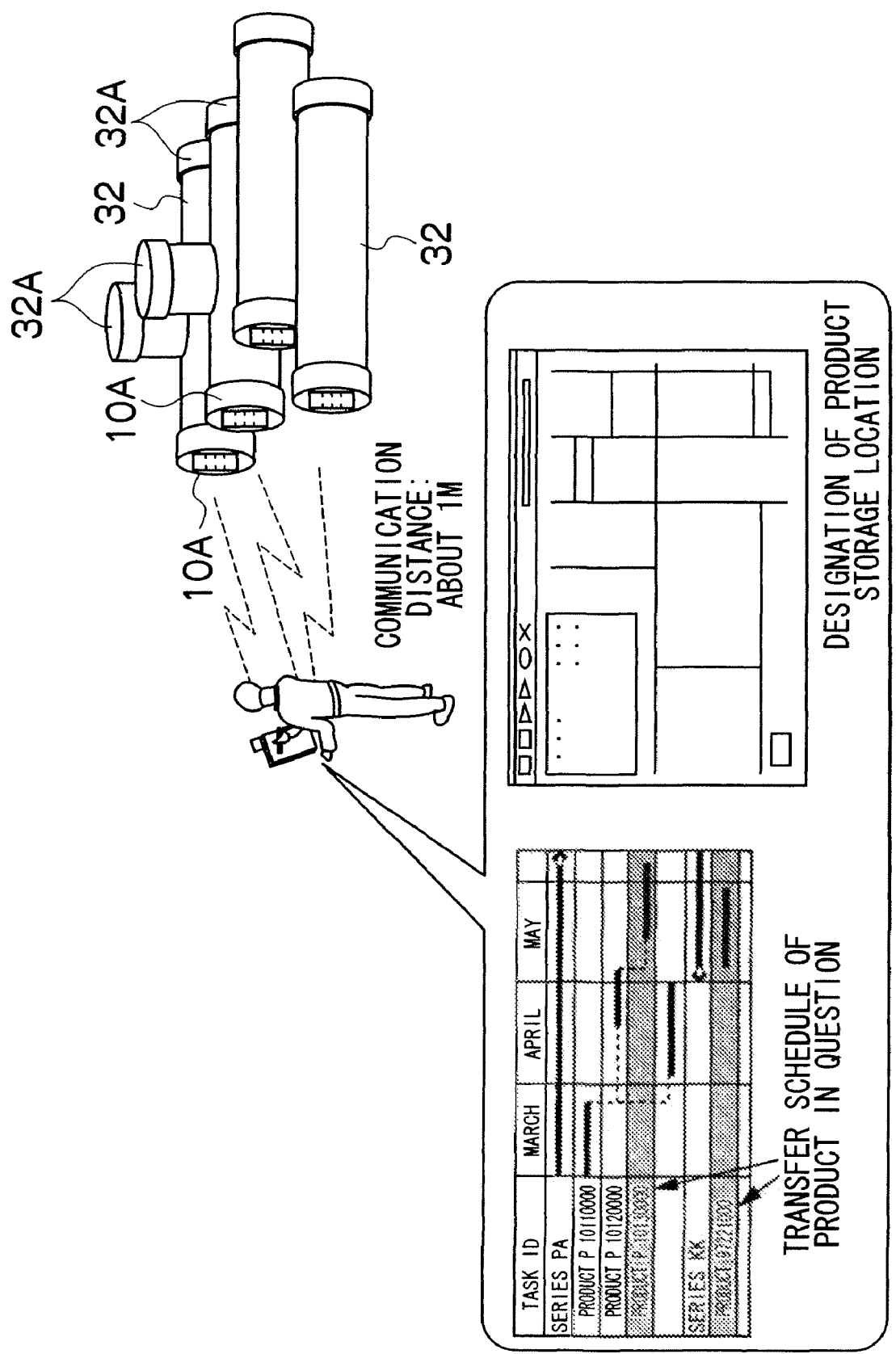

FIG.9

MANAGED POINT INFORMATION FILE

| PARTIAL MANAGEMENT RFID CODE | DRAWING NUMBER | JOINT NUMBER | SYSTEM NAME | BUILDING NAME | AREA NUMBER | ... |
|---|---|---|---|---|---|---|
| B0000100001 | 7M2H345-002 | W001 | CIRCULATING WATER SYSTEM | TURBINE | T3B1345 | .. |
| B0000100002 | 7M2H345-002 | W002 | CIRCULATING WATER SYSTEM | TURBINE | T3B1300 | .. |
| B0000100003 | 7M2H345-002 | W003 | CIRCULATING WATER SYSTEM | TURBINE | T3B1524 | .. |
| B0000100004 | 5M2H345-001 | W021 | MAIN STEAM SYSTEM | TURBINE | T3B1300 | .. |
| B0000100005 | 5M2H345-001 | W011 | MAIN STEAM SYSTEM | R/B | R1B0325 | .. |
| B0000100006 | 5M2H345-001 | W001 | REHEATING SYSTEM | R/B | R1B0333 | .. |
| .. | .. | | .. | .. | .. | .. |

FIG.10

WORK PROGRESS INFORMATION FILE

| PARTIAL MANAGEMENT RFID CODE | DRAWING NUMBER | JOINT NUMBER | PROGRESS STATUS | CONNECTED DEVICE NUMBER | TEST RESULT | ⋯ |
|---|---|---|---|---|---|---|
| B0000100001 | 7M2H345-002 | W001 | FU COMPLETED | P11-2012-R004 | GOOD | ⋮ |
| B0000100002 | 7M2H345-002 | W002 | FU IN PROGRESS | P31-2055-R099 | | ⋮ |
| B0000100003 | 7M2H345-002 | W003 | FU IN PROGRESS | P14-1235-R004 | | ⋮ |
| B0000100004 | 5M2H345-001 | W021 | DELIVERY COMPLETED | P65-1035-R009 | | ⋮ |
| B0000100005 | 5M2H345-001 | W011 | | | | ⋮ |
| B0000100006 | 5M2H345-001 | W001 | | | | ⋮ |
| ⋮ | ⋮ | ⋮ | | | | ⋮ |

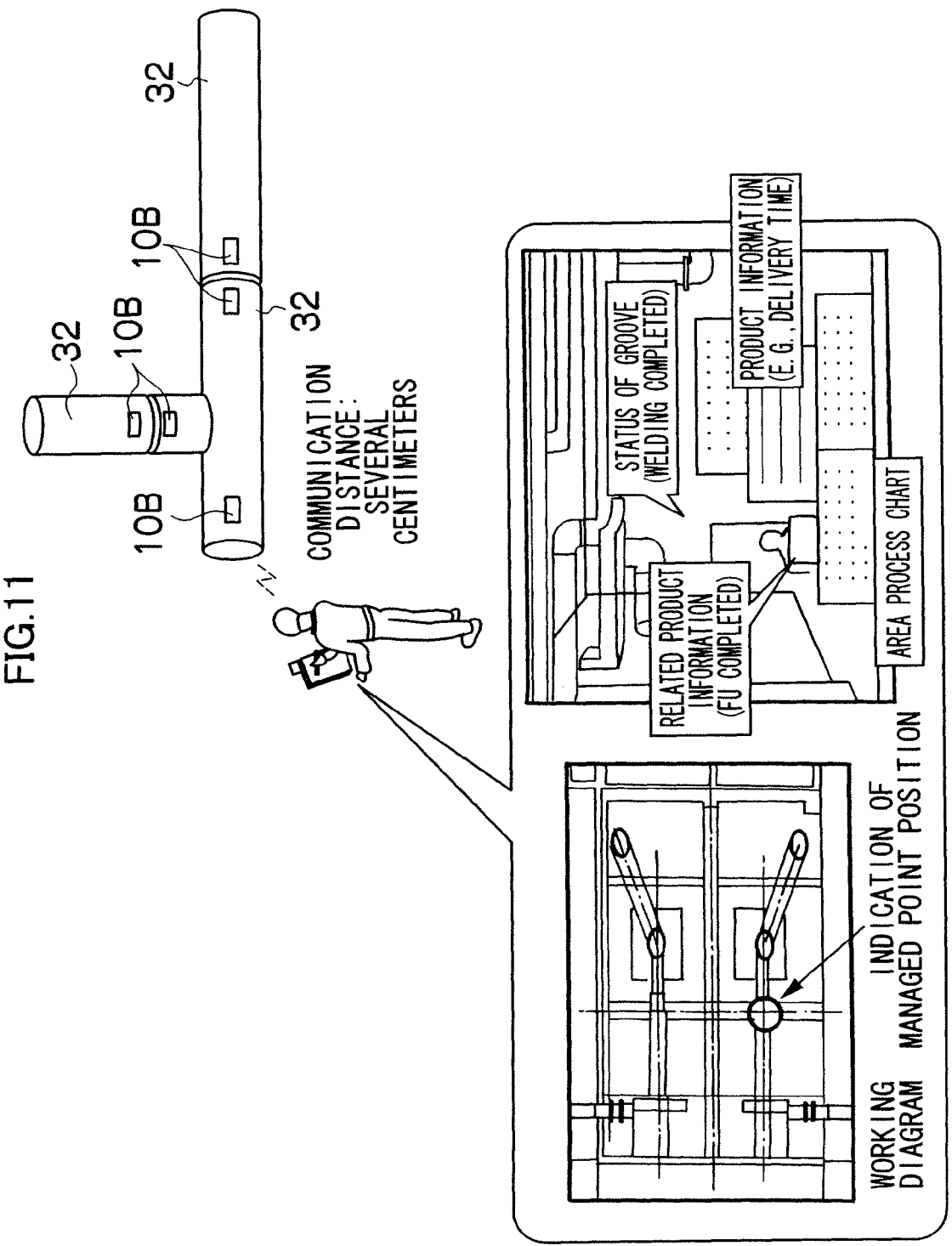

RFID TAG AND CONSTRUCTION SITE MANAGEMENT SYSTEM AND MANAGEMENT METHOD USING THE SAME

BACKGROUND OF THE INVENTION

1. Field of the Invention

The present invention relates to a Radio Frequency Identification (RFID) tag and a construction site management system and management method using the same. More particularly, the invention relates to an RFID tag and a construction site management system and management method using the same for efficiently implementing product management until products manufactured at a factory, such as construction materials and equipment for installation, are used at a construction site, as well as work management when such products are used at the construction site.

2. Description of the Related Art

There are generally two types of information to manage at a construction site in relation to products, such as construction materials and equipment for installation. One is product management until products manufactured at a factory are carried to and used at a construction site, and the other is work management at the time when those products are used at the construction site.

Systems for work management at a construction site using RFID tags include the one described in Japanese Patent Application Laid-Open No. 2005-326965, for example. Japanese Patent Application Laid-Open No. 2005-326965 describes that RFID tags are attached to materials, tools, workers and the like to manage work status, such as progress of a process and workers' working status.

However, a single shared RFID tag as used in Japanese Patent Application Laid-Open No. 2005-326965 has problems of being unable to efficiently perform product and work management and also tending to cause management errors.

For example, one problem is that since not a single piece but multiple pieces of information are required for one product in work management, an RFID tag that has only one RFID function, as in Japanese Patent Application Laid-Open No. 2005-326965, cannot handle this. That is, in product management, one RFID tag can handle one product, whereas in work management, a number of managed points are required for one product. Taking a pipe as an example of such a product, a point at which the pipe is connected represents a managed point in work management. As at least both ends need to be coupled to other equipment and the like for one pipe, both of the ends of the pipe represent managed points. Likewise, a T-shaped pipe has three connecting points and hence three managed points.

In this case, while it is possible to associate the ID of one product with the IDs of its managed points and extract managed point IDs from the ID of one product, because it does not directly associate one piece of RFID information with one managed point ID, mistakes in extracting managed points can be caused. Alternatively, although it is also possible to attach an RFID tag to each managed point of one product for management independently of an RFID tag for product management, it is likely to cause a mistake of erroneously attaching an RFID tag that should be attached to another product to one of a number of managed points.

One task involved in product management is the task of matching management for checking whether the quantity and/or product numbers of products correspond with an invoice when products shipped from a factory are carried into a construction site. To check a large number of products delivered to the construction site in a small amount of time, it is required that a bunch of pipes, for example, loaded on a truck and the like be efficiently read by a reading device from a remote location at a material entrance of the construction site.

On the other hand, work management at the time the products are used at the construction site involves reference of information recorded on an RFID tag on each managed point of products and/or recording of work progress for each managed point. The reading device therefore needs to select and read only an RFID tag that is attached to one managed point that should be currently managed from among RFID tags that are attached to a number of adjacent managed points. In this case, as the distance of RFID tag reading increases, the possibility arises that information on another managed point is also read.

As outlined above, RFID tags used for management of a construction site need to provide different reading performance in the product management phase in which management on a per-product basis is required and the work management phase in which management on a per-managed-point basis and in units of multiple managed points is required, such as connecting points for piping and device adjustment points.

Furthermore, since information referenced or registered in the product management phase is different from information referenced or registered for each managed point, it is necessary to prepare separate RFID tags in order to manage information in association with individual RFIDs. In addition, though RFID tags are sometimes discarded after product management ends, since they respond over a long distance, if they are discarded with their long-distance communication function maintained, they can cause misrecognition when a new product for management is read.

The present invention has been made in view of such circumstances and has an object of providing an RFID tag and a construction site management system and management method using the same that can efficiently implement product management until products manufactured at a factory, such as construction materials and equipment for installation, are used at a construction site as well as work management at the time when such products are used at the construction site, and that also suppress management errors.

SUMMARY OF THE INVENTION

To attain the object, the invention according to a first of the invention aspect provides an RFID tag which transmits/receives information by performing wireless communication with a reading device, including: a long-distance communication RFID having an IC chip and a loop-shaped, long antenna; and a plurality of short-distance communication RFIDs formed inside the loop-shaped antenna that have an IC chip and a short antenna and use a different reading frequency for the reading device from the reading frequency of the long-distance communication RFID, wherein tear-off lines are formed on the RFID tag for separating the short-distance communication RFID from the whole RFID tag, and when the short-distance communication RFID is separated, the loop-shaped antenna of the long-distance communication RFID is also cut up, and the RFID tag has an overall management identification code for identifying the whole tag before separation and a partial management identification code for identifying a partial tag after separation.

According to the first aspect, the RFID of the present invention is integrally formed of the long-distance communication RFID and the short-distance communication RFIDs with different communication distances, and the communication function of the long-distance communication RFID is destroyed by separating the short-distance communication RFID along the tear-off lines formed on the RFID tag. In addition, the RFID tag has an overall management identification code for identifying the tag as a whole before separation and partial management identification codes for identifying separated partial tags.

The RFID tag of the present invention is therefore available for various types of management due to such features as mentioned above. For example, it can be efficiently used for product management in management of a construction site and work management for a number of managed points of a product (e.g., for a pipe, connecting points).

To attain the object, the invention according to a second aspect of the invention provides a construction site management system for managing a product such as a construction material and equipment for installation at a construction site, including: the RFID tag according to the first aspect which is attached on the product; a first reading device which reads in information of long-distance communication RFID of the RFID tag; a second reading device which reads in information of the short-distance communication RFID of the RFID tag; a management server which is capable of communication with the first and second reading devices and has a database for managing entire management information; a communication network which communicates information between the first and second reading devices and the management server; and a plurality of access points for accessing the communication network.

According to the second aspect, the RFID tag having the configuration set forth in the first aspect is used as an RFID tag for managing products such as construction materials and equipment for installation at a construction site. Therefore, the long-distance communication RFID of the RFID tag is utilized in the product management phase in which management on a per-product basis is required and the short-distance communication RFIDs are utilized in the work management phase in which a number of managed points inherent in products (portions of a product to manage) have to be managed, thereby allowing efficient performance of product and work management. Besides, it suppresses occurrence of management errors.

A third aspect of the invention is according to the second aspect, wherein the construction site management system is made up of two systems including: a product management system for management until a product manufactured at a factory is transported to and used at a construction site, the product management system including the long-distance communication RFID of the RFID tag, the first reading device, a file on product management in the database, and an in-premise wide area network included in the communication network for covering in-premise communication at the construction site as well as access points for the in-premise network, and a work management system for managing work progress at the time when the product is used at the construction site, the work management system including the short-distance communication RFIDs of the RFID tag, the second reading device, a file on work management in the database, and an in-building wireless network included in the communication network for covering communication in a building under construction as well as access points for the in-building network.

According to the third aspect, the product management system for management until a product manufactured at a factory is transported to and used at a construction site and the work management system for managing progress of use of the product at the construction site selectively use the long-distance communication RFID and the short-distance communication RFIDs of the RFID tag, and use accordingly separate reading devices, files in the database, and communication networks. Consequently, information for product management and information for work management can be kept separate reliably. This prevents mistakes in product or work management.

A fourth aspect of the invention is according to the second or third aspect, wherein the first reading device is capable of reading in information of the long-distance communication RFID over a distance of several meters, and has RFID reading function which supports a frequency that responds only to the long-distance communication RFID, information processing function for temporarily storing information read and retrieving associated information and/or activating a necessary function, support function for supporting a product management task, communication function for communicating with the management server, and display function for displaying information which is output from the function for supporting the product management task.

The fourth aspect describes preferable functional configurations of the first reading device used in product management.

A fifth aspect of the invention is according to the third or fourth aspect, wherein in a database for product management of the management server, information on the premises of the construction site, information on a process chant for construction work, product shipment information, product information, and management supporting information for supporting the management task of the product are stored being associated with a code name of the long-distance communication RFID.

The fifth aspect describes preferable pieces of information to store in the database of the management server for product management. Such information can be displayed on a monitor of the first reading device via the in-premise wide area network and its access points.

A sixth aspect of the invention is according to the fifth aspect, wherein the first reading device reads the RFID code of the product from the long-distance communication RFID of the RFID tag attached on the product, references an area and the time of transporting the product from the management supporting information stored in the product management database and displays the area and the time as the process chart information, and displays a product storage location as a candidate together with the premise information.

The sixth aspect describes exchange of information transmitted/received between the first reading device and the database of the management server.

A seventh aspect of the invention is according to any one of the first to sixth aspect, wherein the second reading device is capable of reading in information of the short-distance communication RFIDs over a distance of several tens of centimeters, and has RFID reading function which supports a frequency that responds only to the short-distance communication RFIDs, information processing function for temporarily storing information read and retrieving associated information and/or activating a necessary function, support function for supporting work progress management, communication function for communicating with the management server, and display function for displaying information which is output from the function for supporting the work progress management.

The seventh aspect describes preferable functional configurations of the second reading device used in work management.

An eighth aspect of the invention is according to the seventh aspect, wherein in a work management database of the management server, area process at the construction site, working diagrams, 3D-CAD, progress of peripheral work, and supporting information for supporting management of work progress relating to a managed point of a material are stored being associated with a code name of the short-distance communication RFID.

The eighth aspect describes preferable pieces of information to store in the database of the management server for work management. Such information can be displayed on a monitor of the second reading device via the in-building wireless network and its access points.

To attain the above object, the invention according to a ninth aspect of the invention provides a construction site management method for managing a product such as a construction material and equipment for installation at a construction site, the method implementing for each product: a first step of associating a long-distance communication RFID code name of an overall management RFID tag which represents the RFID tag according to the first aspect as a whole with product management information stored in a database of a management server; a second step of attaching the overall management RFID tag for which the association is completed to the product at a factory manufacturing the product; a third step of shipping the product on which the overall management RFID tag has been attached to the construction site; a fourth step of reading, at the construction site, the long-distance communication RFID code name of the overall management RFID tag with the first reading device to check products delivered to the construction site and recording the result of the checking into the database; a fifth step of transporting the product delivered to the construction site to a worksite concerned or a provisional storage area; a sixth step of separating a plurality of partial management RFID tags having short-distance RFIDs from the overall management RFID tag; a seventh step of associating managed point information in a database with each code name of the plurality of separated partial management RFID tags; an eighth step of reading the code name of the partial management RFID tags with the a second reading device to check the positions and number of managed points of the product; a ninth step of attaching the partial RFID tags for which the checking is completed to the respective managed points, and collecting or discarding the overall management RFID tag after separation; and a tenth step of implementing installation work of the product on which the partial management RFID tags are attached and recording the progress of the work in the database.

The ninth aspect shows the steps of the construction site management method of the invention. By implementing the steps, it is possible to efficiently perform product management until a product manufactured at a factory is used at a construction site as well as work management at the time when the product is used at the construction site. Besides, management errors are hard to occur.

According to the present invention, it is possible to efficiently perform product management until products manufactured at a factory, such as construction materials and equipment for installation, are used at a construction site and work management during use of the products at the construction site, and also suppress management errors.

BRIEF DESCRIPTION OF THE DRAWINGS

FIG. 6 shows an example of a product information file showing product information communicated between first reading device and a database of a management server;

FIG. 7 shows an example of a product management file which is communicated between the first reading device and the database of the management server for recording management status of products;

FIG. 8 illustrates an example of display provided on a monitor for the first reading device in product management;

FIG. 9 shows an example of a managed point information file which shows managed point information communicated between the second reading device and a database of a management server;

FIG. 10 shows an example of a managed point management file which is communicated between the second reading device and the database of the management server for recording management status of managed points; and FIG. 11 illustrates an example of display provided on the monitor for the first reading device in management of managed points.

DETAILED DESCRIPTION OF THE PREFERRED EMBODIMENTS

A preferred embodiment of the RFID tag as well as the construction site management system and management method according to the invention will be described with respect to attached drawings.

Figure 1:
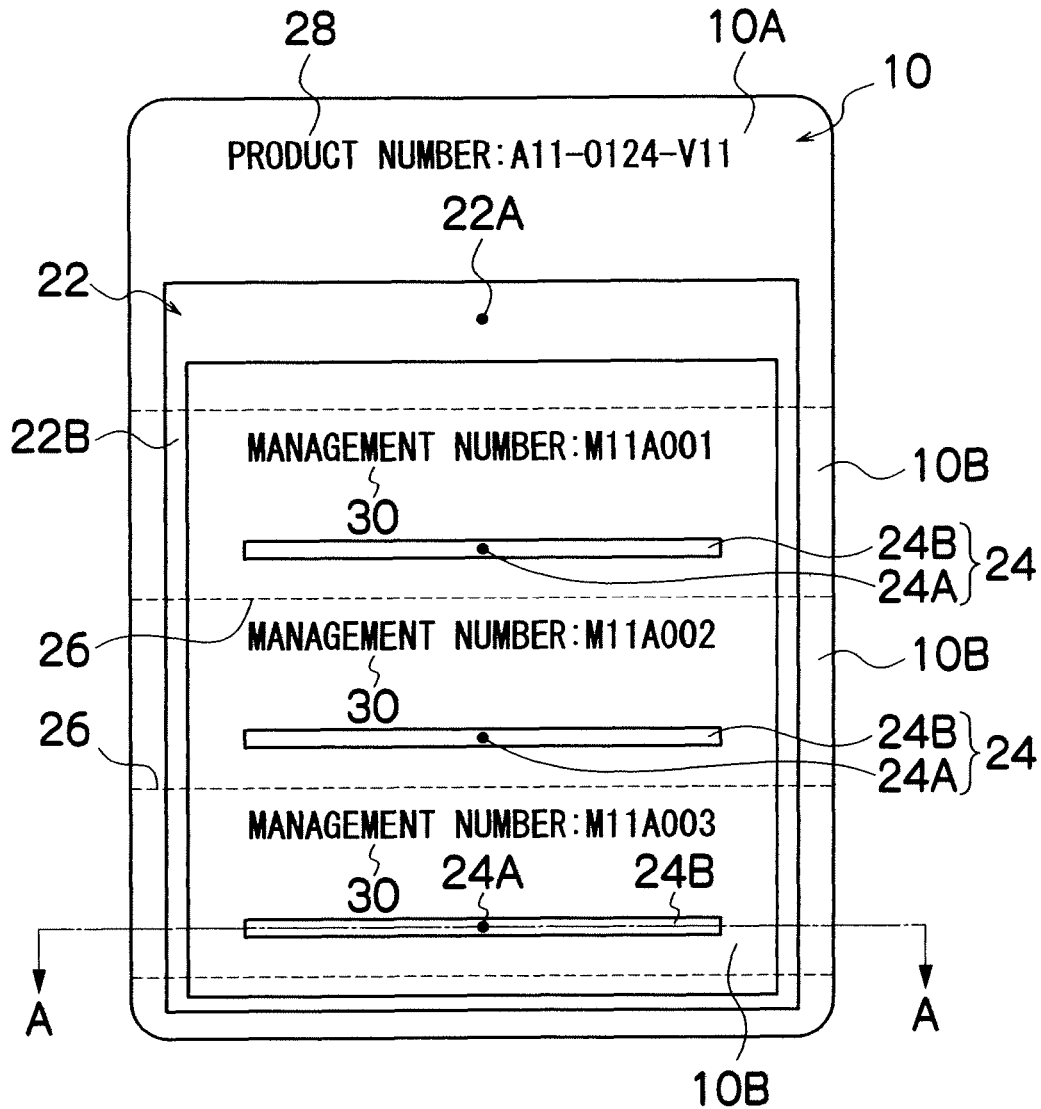
FIG. 1 is a front view of an RFID tag according to the present invention.
Figure 2:
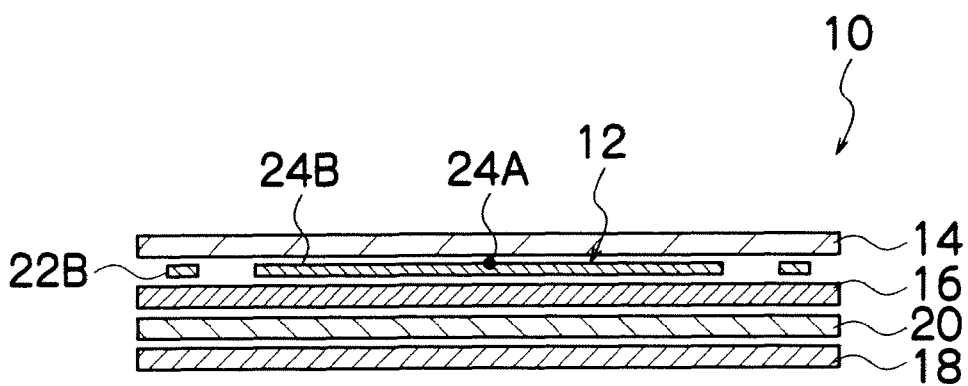
FIG. 2 is a cross-sectional view of the RFID tag according to the invention.

FIG. 1 illustrates an example of the RFID tag according to the present invention and FIG. 2 is a cross-sectional view along the line A-A in FIG. 1. While the RFID tag of the invention is available for various applications, this embodiment describes it as utilized in a management system for managing products, such as construction materials and equipment for installation, at a construction site. Also, a pipe will be taken as an example of products such as construction materials.

As illustrated in FIG. 2, an RFID tag 10 is formed in a five-layer structure including an RFID substrate 12, a surface protection sheet 14 provided on the front side of the RFID substrate 12, a back protection sheet 16 provided on the back side of the REID substrate 12, a release sheet 18 provided on the side of the back protection sheet 16, and an adhesive layer 20 which bonds the back protection sheet 16 to the release sheet 18 such that the release sheet 18 is peelable.

The front and back protection sheets 14 and 16 may be a thin sheet, such as paper and plastic film, and an IC chip and an antenna for RFID are sandwiched between the front and back protection sheets 14 and 16.

Antennas 22B and 24B formed on the RFID substrate 12 are made of metallic yet thin steel wire and the like. Under the protecting layers is the adhesive layer 20, on which the release paper 18 for sticking is pasted. An adhesive for use with the adhesive layer 20 can preferably adhere to metal because many of products like construction materials and equipment for installation are made of metal. The release sheet 18 may be a thin sheet such as paper and plastic film.

As illustrated in FIG. 1, the RFID substrate 12 is composed of a long-distance communication RFID 22 which has an IC chip 22A and a long, loop-shaped antenna 22B, and a plurality of short-distance communication RFIDs 24 formed inside the loop-shaped antenna 22B that have an IC chip 24A and a rod-shaped, short antenna 24B and use a different reading frequency for the reading device (a reader/writer) from that of the long-distance communication RFID 22.

The long-distance communication RFID 22 is a tag utilizing long-distance communication such as in UHF band and has the antenna 22B of a size appropriate for a frequency. The antenna 22B is formed in a loop, inside which the short-distance communication RFIDs 24 are enclosed. Although FIG. 1 illustrates three short-distance communication RFIDs 24, the number is not limited to three and any number will do as long as it is plural.

The short-distance communication RFID 24 is a tag utilizing short-distance communication such as in 2.45 GHz band and has a short antenna structure.

On the RFID tag 10, tear-off lines 26 (e.g., perforation) are formed for separating the short-distance communication RFIDs 24 from each other, and when the RFIDs 24 are separated, the loop-shaped antenna 22B of the long-distance communication RFID 22 is also cut up. Here, there is no problem to antenna function because the antenna 22B of the long-distance communication RFID 22 is partly connected though the tear-off lines 26 partly run on it. As a result, a number of tags having the short-distance communication RFID 24 are formed. In addition, by cutting the RFID tag 10 along the tear-off lines 26, the communication capability of the long-distance communication RFID 22 is destroyed.

Here, a tag that manages the whole RFID tag 10 before the short-distance communication RFIDs 24 are separated along the tear-off line 26 is called an overall management RFID tag 10A, and each of separated RFID tags (i.e., small tags separated from the whole tag along the tear-off line 26) is called a partial management RFID tag 10B.

In the IC chip 22A for the long-distance communication RFID 22, there is registered an overall management RFID code name, which is an identification code for product management of pipes manufactured at a factory until they are carried to and use at the construction site, and also a product number 28 is printed on the front protection sheet. Meanwhile, in the IC chips 24A of the short-distance communication RFIDs 24, a partial management RFID code is registered that is an identification code for work management when a pipe 32 (see FIG. 3) is used at the construction site, and a management number 30 is printed on the front protection sheet.

When the overall management RFID tag 10 A is attached on the pipe 32, only the release paper 18 on the uppermost one (i.e., the portion not being the partial management tag 10B) of five pieces partitioned by the four tear-off lines 26 is peeled and the overall management RFID tag 10A is stuck on the pipe 32 or a cap 32A of the pipe 32 for product management until the pipe 32 manufactured at a factory up is used at the construction site.

Figure 4:
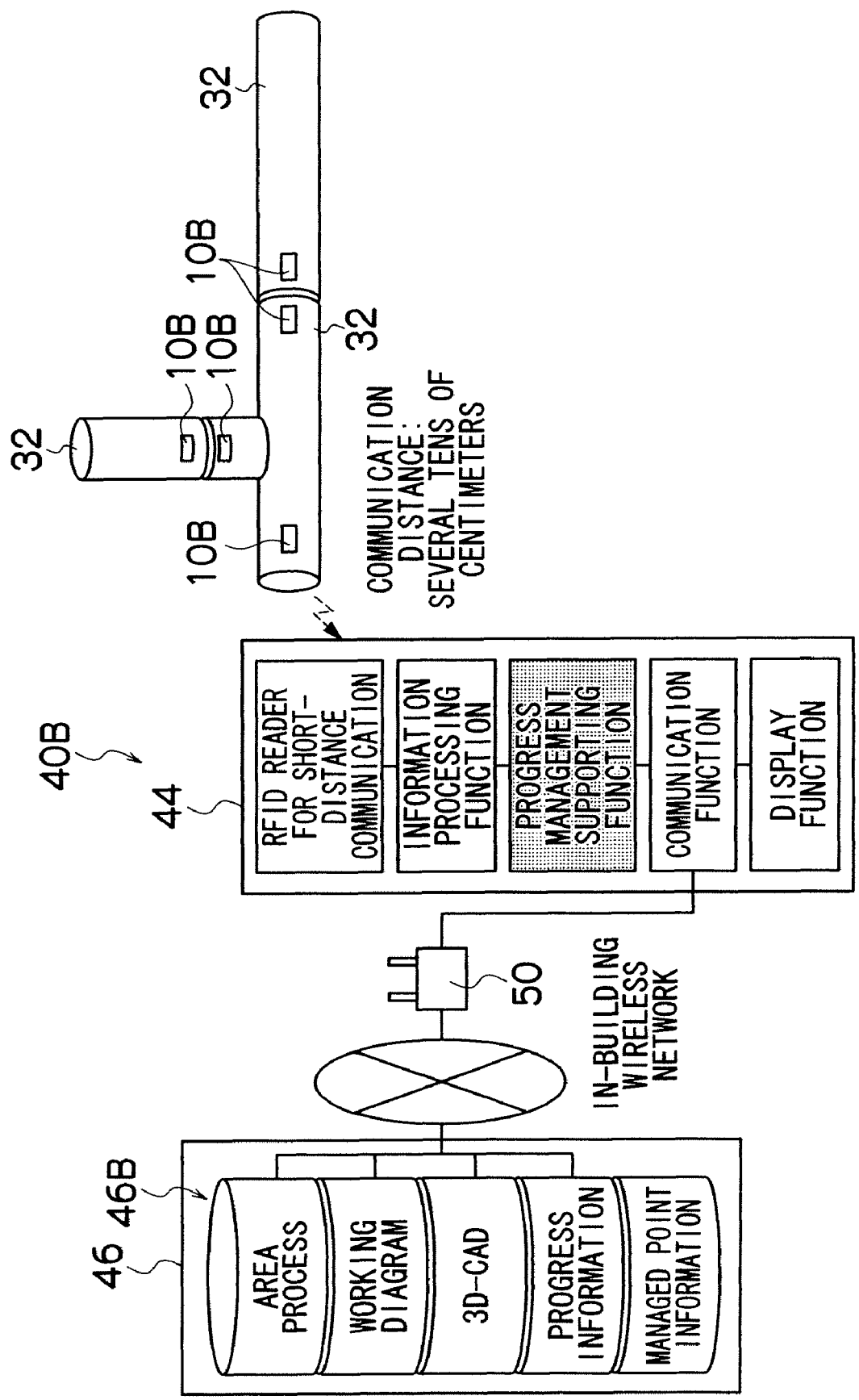
FIG. 4 shows a device configuration for use with a work management system included in the construction site management system of the invention.

Meanwhile, for work management when the pipe 32 is used at the construction site, the partial management tag 10B is separated along the tear-off line 26 on the overall management RFID tag 10A, then the release paper 18 is peeled and the tag 10B is stuck on a managed point of the pipe 32 (see FIG. 4). Typically, the managed point of the pipe 32 is a connecting point, and as there are two of them at the both ends of the pipe, the partial management tag 10B is stuck to each of the two positions. A T-shaped pipe 32 has three managed points so that the partial management tag 10B is pasted to each of the three positions. Therefore, the overall management RFID tag 10A need to have the partial management tags 10B as many as the number of managed points of a product for management, such as the pipe 32.

Next, the overall configuration of a construction site management system 40 (40A, 40B) according to the invention will be described by illustrating management of a pipe (an example of products) using the RFID tags having the above-described configuration.

Figure 3:
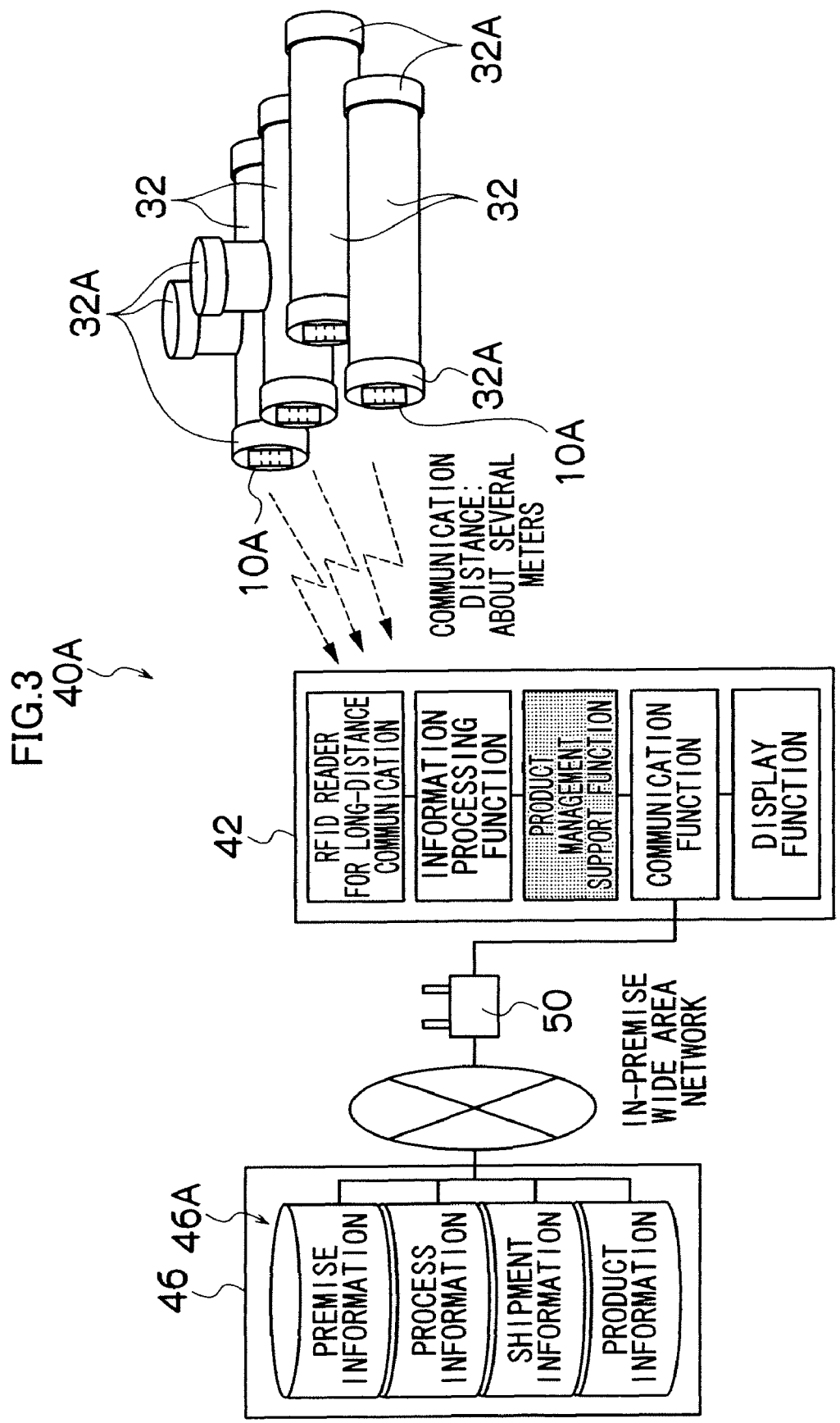
FIG. 3 shows a device configuration for use with a product management system included in a construction site management system of the present invention.

As shown in FIGS. 3 and 4, the device configuration of the construction site management system 40 according to the present invention mainly composed of the overall management RFID tag 10A which is attached on the pipe 32, a first reading device 42 which reads the long-distance communication RFID 22 of the overall management RFID tag 10A, a second reading device 44 which reads the short-distance communication RFIDs 24 of the partial management RFID tags 10B, a management server 46 which can communicate with the first and second reading devices 42, 44 and has a database 46A for managing overall information for product and work management, and a communication network for communicating information between the first and second reading devices 42, 44 and the management server 46. The communication network is composed of an in-premise wide area network for covering communication within the premises of the construction site and an in-building wireless network for covering communication within a building under construction. These networks are made up of communication networks including a plurality of access points 50. The first and second reading devices 42 and 44 are carried by an on-site worker or site supervisor, and the management server 46 is installed at a management center and the like in a field office. The factory where the pipe is manufactured and the database of the management server installed at the construction site are connected to each other through an Internet line and the like.

The construction site management system 40 of the invention generally includes two management phases. One is a product management system 40A for management until the pipes 32 manufactured at a factory are carried to the construction site and used for construction work as shown in FIG. 3. The other one is a work management system 40B for managing progress of a construction process, such as installation, after the pipes 32 are carried into the construction site as shown in FIG. 4.

The device configuration for use with the product management system 40A includes the overall management RFID tag 10A which is attached on the pipes 32, the first reading device 42, the management server 46, and the in-premise wide area network, as illustrated in FIG. 3. On the other hand, the device configuration for use with the work management system 40B includes the partial management RFID tags 10B which are separated from the overall management RFID tag 10A and attached to the managed points of the pipes 32, the second reading device 44, the management server 46, and the in-building wireless network. The two management systems 40A and 40B have separate reading devices 42 and 44 as they use different frequencies for RFIDs to be read as mentioned above. In addition, the management server 46 provides separate databases 46A and 46B as appropriate for contents managed by a referencing entity (i.e., product management and work management) in accordance with an RFID code name read by the first or second reading device.

As shown in FIG. 3, the first reading device 42 for use in product management has reading function which supports a frequency that responds only to the long-distance communication RFID 22 for long distance communication (about several meters), information processing function for temporarily storing an RFID that has been read and retrieving associated information and/or activating a necessary function, product management supporting function for supporting management of the pipe 32, communication function for connecting to the database 46A of the management server 46, and display function for displaying information output from the product management supporting function.

As specific functions of the product management support, information in the database 46A, which stores information on the premises of the construction site, a process table, product shipment, products, and so on, can be referenced from the in-premise wide area network via an access point for the wireless LAN installed in the construction site, and display appropriate for the product management support can be provided on the first reading device 42.

As shown in FIG. 4, the second reading device 44 for use in work management has reading function which supports a frequency that responds only to the short-distance communication RFID 24 for short distance communication (about several tens of centimeters), information processing function for temporarily storing an RFID that has been read and retrieving associated information and/or activating a necessary function, support function for supporting management of work progress, communication function for connecting to the database 46B of the management server 46, and display function for displaying information output from the work progress management supporting function.

As specific functions of the work progress support, information in a database, which stores information on work area process, working diagrams, 3D-CAD, progress of peripheral work, managed points, and so on, can be referenced from the in-building wireless network via the access point 50 for a wireless LAN and the like installed in a building under construction, and display appropriate for the work progress management support can be provided on the second reading device.

Next, in accordance with FIG. 5, an example of a step flow of a management method for managing products, such as construction materials and equipment for installation, with the construction site management system of the invention will be described taking a pipe as an example.

Figure 5:
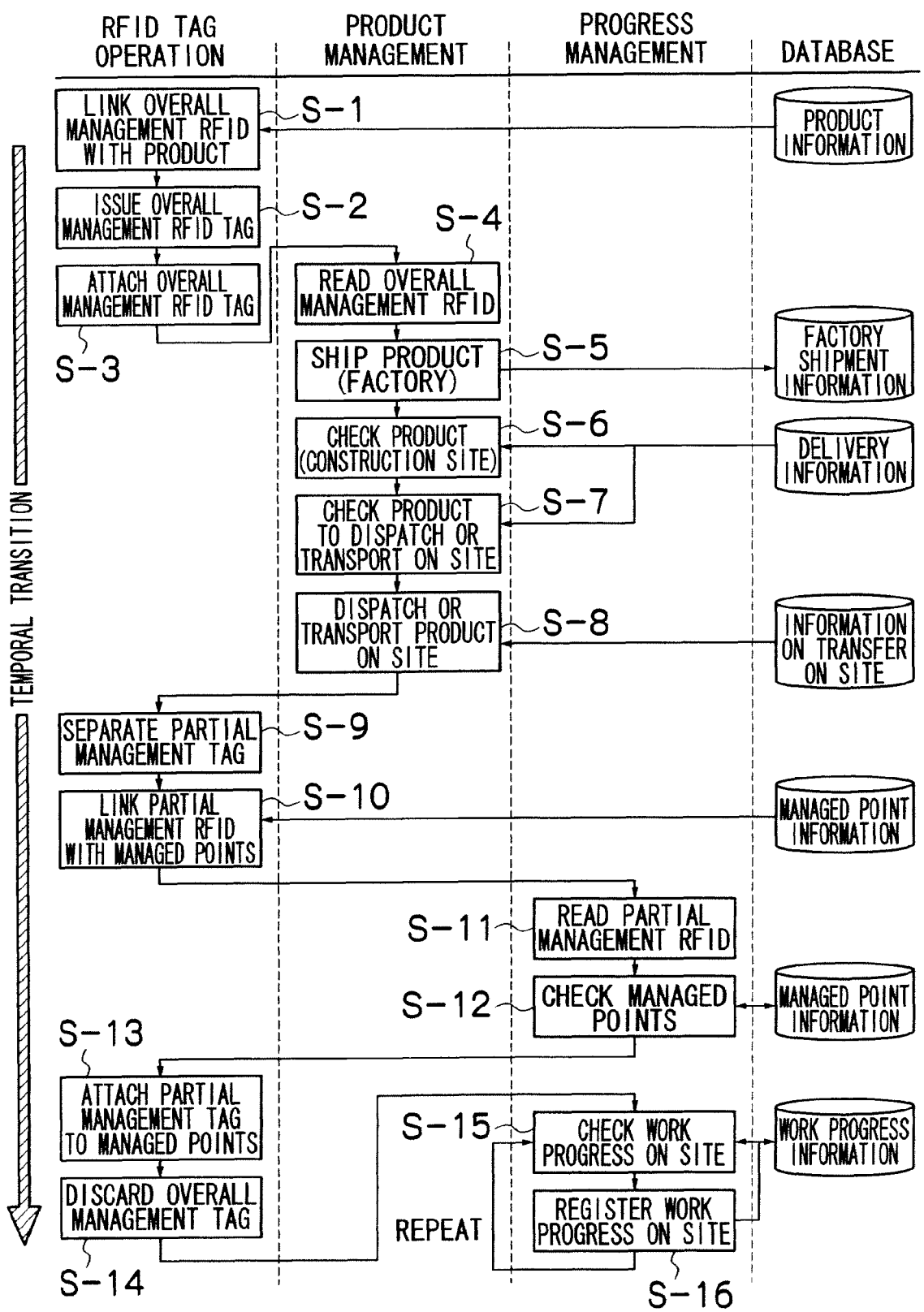
FIG. 5 is a flowchart illustrating the procedure of implementing the construction site management system of the invention.

The longitudinal direction in FIG. 5 denotes the temporal transition of management and the horizontal direction shows the operation status of the RFID tag 10, identification of steps in the product management phase or the work management phase, and information communicated between the first and the second reading devices 42, 44 and the databases 46A, 46B of the management server 46, which correspond to the temporal transition.

(Product Management Phase)

Association (also called linking) relating to product information is made in advance between an overall management RFID code name which is registered in the long-distance communication RFID 22 of the overall management RFID tag 10A and the database 46A of the management server 46 (Step 1). Then, the overall management RFID tag 10A for which association of product information is finished is issued (Step 2).

Then, a worker of the factory manufacturing the pipe 32 peels only the release paper 18 on the uppermost portion of the issued overall management RFID tag 10A, and sticks the tag 10A to the cap 32A of the pipe 32 manufactured at the factory (Step 3). The worker may also stick the tag 10A to the pipe 32 itself, in addition to the cap 32A. The factory worker reads information corresponding to the overall management RFID code name at the point when the pipe 32 is shipped to the construction site, and transmits the information to the database 46A as factory shipment information (Step 4). The reading device for reading the overall management RFID 10A at the factory may be similar to the first reading device 42 used at the construction site.

Then, the pipe 32 with the overall management RFID tag 10A attached thereon is loaded on a transport device such as a truck in a bunch and shipped to the construction site with an invoice (Step 5). As a result, when the pipe 32 manufactured at the factory is shipped to the construction site, product information corresponding to the overall management code name of the pipe 32 has been associated with the overall management RFID tag 10A attached on the cap 32A of the pipe 32.

Accordingly, by reading the overall management code name of the overall management RFID tag 10A attached on the pipe 32 with the first reading device 42, it is possible to retrieve and display corresponding product information stored in the database 46A. The product information may include overall management RFID tag code, product number, factory shipment number, the system name of construction which uses the pipe 32, the name of a building under construction, area number and the like, as shown in a product information file of FIG. 6, and is recorded being associated with an overall management RFID code.

Next, when the pipe 32 is delivered to the construction site, a worker at the construction site checks the products (Step 6). Specifically, the site worker reads the overall management RFID tag 10A on the pipe 32 which has arrived at the construction site with the first reading device 42 to read the factory shipment information which was recorded in the database 46A at the time of shipment from the factory, that is, delivery information, and checks whether the information read corresponds with the invoice. It is required that the factory shipment numbers shown in FIG. 6 correspond with the ones in the invoice. That is, assuming that products with the number K001 were shipped from the factory as the same type of pipes in the file of FIG. 6, the worker decides that there is no mistake in the delivered products if the overall management RFID codes corresponding to those products are the same as the overall management RFID code that was read when the pipe 32 was delivered to the construction site. In case of misdelivery of the pipe 32, there will be disagreement of RFID codes, so that the misdelivery can be found quickly at the time of delivery to the construction site Then, for the pipe 32 delivered from the factory to the construction site for which product check is completed, the site worker inputs "Delivered" in a "Delivery to Site" field in a production management information file of FIG. 7. The product information management file preferably has information entries such as overall management RFID code, product number, factory progress (whether already shipped from the factory or not), delivery to site, provisional storage area and so forth.

The pipes 32 delivered to the construction site are typically provisionally maintained at a product storage on the construction site, though some of them are carried to the worksite immediately after delivery. Therefore, the site worker should check when the delivered pipe 32 is going to be transported to the worksite and decide in which product storage the pipe 32 should be provisionally maintained in accordance with the time of their transportation. To support these decisions, the site worker obtains a product number from the overall management RFID code, and from the product number identifies the area number recorded in the product information file, namely a construction area that will use the pipe 32. The site worker also references the time of transfer to the product storage of the area number and the like from the database of FIG. 6, and displays it on a monitor for the first reading device 42 as process chart information. Then, the site worker checks a provisional storage area that is near the area number in the product management information file (Step 7). Then, the site worker dispatches or transports the pipes 32 to the product storage corresponding to the provisional storage area (Step 8).

In this case, as shown in FIG. 8, display of a candidate provisional storage area with premise information enables prompt issuance of a work instruction. Also at the stage of transporting the pipe delivered to the construction site to a specified provisional storage area on the worksite, by reading and checking the overall management RFID tag 10A on the pipe 32 for which an instruction for provisional storage in a provisional storage area has been given with the first reading device 42, the specified pipe 32 can be reliably selected and provisionally maintained in a designated provisional storage area. After the pipe 32 is transported to the specified provisional storage area, the pipe 32 is provisionally kept with the cap 32A removed. This completes the steps in the product management system and the process proceeds to the steps of the following work management system.

(Work Management Phase)

In the case of the pipe 32, a number of connecting points on the single pipe 32 are handled as managed points in construction work. Accordingly, at a point when the product management phase has finished, the partial management RFID tags 10B are separated from the overall management RFID tag 10A attached on the cap 32A of the pipe 32 (Step 9).

Then, the separated partial management RFID tags 10B are read with the second reading device 44, and the code names of the partial management RFID tags 10B and information on the managed points are associated or linked with each other in advance between the second reading device 44 and the database 46B of the management server 46 (Step 10). As shown in FIG. 9, the managed point information file in the database 46B stores as information partial management RFID code, drawing number, joint number, the system name of construction which involves piping, building, area number and so on. Thus, by knowing a drawing number and a joint number that correspond to a partial management RFID code of interest, the location and/or number of managed points of a pipe can be uniquely determined.

Next, the partial management RFID tags 10B for which association is completed are read with the second reading device 44 again (Step 11), and managed points are checked with the database 46B (Step 12).

Then, the site worker attaches the partial management RFID tags 10B for which checking is completed to the respective managed points (i.e., connecting points) of the pipe 32 (Step 13). Meanwhile, the overal management RFID tag 10A remaining on the cap 32A of the pipe 32 is collected with the cap 32A or discarded (Step 14). In this case, communication capability is destroyed at the point when the partial management RFID tags 10B are separated from the overall management RFID tag 10A because the long-distance communication antenna 22B of the overall management RFID tag 10A is cut up. Therefore, even if the overall management RFID tag 10A left on the cap 32A of the pipe 32 mingles with unused overall management RFID tags 10A when it is discarded, there is no concern that the discarded tag 10A is falsely recognized. Incidentally, if the overall management RFID tag 10A is discarded without the antenna 22B being cut, long distance communication remains possible, which leads to a problem of erroneously reading the discarded RFID tag instead of an RFID tag on a product which should be read if the discarded tag 10A happens to mingle with unused RFID tags.

Next, connection of the pipe 32 on which the partial management RFID tags 10B are attached at the number of managed points is performed and progress of the connection work is managed (Step 15). Specifically, the partial management RFID tags 10B attached on the pipe 32 are read with the second reading device 44, and a work progress information file shown in FIG. 10 is retrieved from the database 46B of the management server 46. Then, information read is associated with the partial management RFID code of the pipe 32 which is under construction, and the progress of the connection work is recorded in the work progress information file (Step 16). For example, for the pipe 32, its connecting points represent the managed points, and the progress of a process, such as groove alignment (FU) of connecting points in progress, groove alignment (FU) completed, groove alignment (FU) test completed, welding in progress, welding completed and so on, is recorded in sequence as illustrated in FIG. 10. The steps 16 and 17 are repeated for all products.

Information read from the partial management RFID tag 10B is referenced not only when the site worker records to the work progress information file. For example, as shown in FIG. 10, it can be also used when an inspector checks which product on a drawing represents a device to be tested. Furthermore, the site supervisor who gives instructions for work can retrieve information on managed points in the vicinity of a work point from the partial management RFID tag 10B so as to plan building and shared use of scaffolding and the like in accordance with the work status at an adjacent point near the work point where the work in question is performed and/or check whether the process in a work area agrees with the actual work. The site supervisor can also check information useful for giving work instructions, e.g., for connection work of a pipe, the delivery status of a device to which the pipe will be connected (i.e., the connected device in FIG. 10).

As described above, the present invention utilizes the overall management RFID tag which is utilized in the product management phase and capable of long distance communication as well as the partial management RFID tags provided inside it and having short-distance communication function for managing a plurality of managed points in the work management phase, and selectively uses the two types of tags in the product management phase and the work management phase. This enables efficient site management. In addition, since the overall management RFID tag is capable of long distance communication, it allows a large amount of product information to be read at a time. On the other hand, the partial management RFID tag attached on a managed point of a product supports short distance communication and therefore allows only a managed point of interest to be accurately read.

Additionally, information useful for product management can be associated with the overall management RFID tag used in the product management phase so as to support management of product transportation and/or selection of a provisional depository at the construction site. On the other hand, information on managed points of products can be associated with the partial management RFID tag for use in the work management phase, so that the progress of overall work can be referenced in real time from comparison with a working drawing and/or status of adjacent managed points and instructions for work can be efficiently given.

In addition, by storing product management information associated with the overall management RFID tag and work management information associated with the partial management RFID tag in separate files in the databases of the management server, it is possible not only to improve the efficiency of product and work management but prevent information errors in product and work management.

Furthermore, by separating the partial management RFID tag from the overall management RFID tag along the tear-off line, it is possible to disable the capability of the overall management RFID tag which has long-distance communication function utilized for product management. As a result, communication with the overall management RFID tag is automatically made impossible upon completion of product management, which can prevent misrecognition during work management caused by picking up a signal from a discarded overall management RFID tag.

While this embodiment was described by taking pipes as an example of products, it can be applied to any of materials used for construction, equipment for installation, and so forth.

What is claimed is:

1. A construction site management system for managing a construction material product and equipment for installation at a construction site, comprising:
   the RFID tag which is attached on the product, the RFID tag comprising: a long-distance communication RFID having an IC chip and a loop-shaped long antenna; a plurality of short-distance communication RFIDs formed inside the loop-shaped antenna that have an IC chip and a short antenna and use a different reading frequency for the reading device from the reading frequency of the long-distance communication RFID wherein tear-off lines are formed on the RFID tag for separating the short-distance communication RFID from the whole RFID tag, and when the short-distance communication RFID is separated the loop-shaped antenna of the long-distance communication RFID is also cut up and the RFID tag has an overall management identification code for identifying the whole tag before separation and a partial management identification code for identifying a partial tag after separation;
   a first reading device which reads the long-distance communication RFID of the RFID tag;
   a second reading device which reads the short-distance communication RFID of the RFID tag;
   a management server which is capable of communication with the first and second reading devices and has a database for managing entire management information;
   a communication network which communicates information between the first and second reading devices and the management server and
   a plurality of access points for accessing the communication network;
   wherein
   the construction site management system is made up of two systems including:
   a product management system for management until a product manufactured at a factory is transported to and used at a construction site, the product management system including the long-distance communication RFID of the RFID tag, the first reading device, a file on product management in the database, and an in-premise wide area network included in the communication network for covering in-premise communication at the construction site as well as access points for the in-premise network, and
   a work management system for managing work progress at the time when the product is used at the construction site, the work management system including the short-distance communication RFIDs of the RFID tag, the second reading device, a file on work management in the database, and an in-building wireless network included in the communication network for covering communication in a building under construction as well as access points for the in-building network.

2. The construction site management system according to claim 1, wherein the first reading device is capable of reading the long-distance communication RFID over a distance of several meters, and has RFID reading function which supports a frequency that responds only to the long-distance communication RFID, information processing function for temporarily storing information read and retrieving associated information and/or activating a necessary function, support function for supporting a product management task, communication function for communicating with the management server, and display function for displaying information which is output from the function for supporting the product management task.

3. The construction site management system according to claim 1, wherein, in a database for product management of the management server, information on the premises of the construction site, information on a process chant for construction work, product shipment information, product information, and management supporting information for supporting the management task of the product are stored being associated with a code name of the long-distance communication RFID.

4. The construction site management system according to claim 3, wherein the first reading device reads the RFID code of the product from the long-distance communication RFID of the RFID tag attached on the product, references an area and the time of transporting the product from the management supporting information stored in the product management database and displays the area and the time as the process chart information, and displays a product storage location as a candidate together with the premise information.

5. The construction site management system according to claim 1, wherein the second reading device is capable of reading the short-distance communication RFIDs over a distance of several tens of centimeters, and has RFID reading function which supports a frequency that responds only to the short-distance communication RFIDs, information processing function for temporarily storing information read and retrieving associated information and/or activating a necessary function, support function for supporting work progress management, communication function for communicating with the management server, and display function for displaying information which is output from the function for supporting the work progress management.

6. The construction site management system according to claim 5, wherein, in a work management database of the management server, area process at the construction site, working diagrams, 3D-CAD, progress of peripheral work, and supporting information for supporting management of work progress relating to a managed point of a material are stored being associated with a code name of the short-distance communication RFID.

7. A construction site management method for managing a construction material product and equipment for installation at a construction site, the method implementing for each product:
   preliminarily attaching an RFID tag on the product the RFID tag comprising: a long-distance RFID having an IC chip and a loop-shaped, long antenna; a plurality of short-distance communication RFIDs formed inside the loop-shaped antenna that have an IC chip and a short antenna and use a different reading frequency for the reading device from the reading frequency of the long-distance communication RFID wherein tear-off lines are formed on the RFID tag for separating the short-distance communication RFID from the whole RFID tag and when the short-distance communication RFID is separated, the loop-shaped antenna of the long-distance communication RFID is also cut up, and the RFID tag has an overall management identification code for identifying the whole tag before separation and a partial management identification code for identifying a partial tag after separation;

a first step of associating a long-distance communication RFID code name of an overall management RFID tag which represents the RFID tag as a whole with product management information stored in a database of a management server;

a second step of attaching the overall management RFID tag for which the association is completed to the product at a factory manufacturing the product;

a third step of shipping the product on which the overall management RFID tag has been attached to the construction site;

a fourth step of reading, at the construction site, the long-distance communication RFID code name of the overall management RFID tag with the first reading device to check products delivered to the construction site and recording the result of the checking into the database;

a fifth step of transporting the product delivered to the construction site to a worksite concerned or a provisional storage area;

a sixth step of separating a plurality of partial management RFID tags having short-distance RFID from the overall management RFID tag;

a seventh step of associating managed point information in a database with each code name of the plurality of separated partial management RFID tags;

an eighth step of reading the code name of the partial management RFID tags with the a second reading device to check the positions and number of managed points of the product;

a ninth step of attaching the partial RFID tags for which the checking is completed to the respective managed points, and collecting or discarding the overall management RFID tag after separation; and a tenth step of implementing installation work of the product on which the partial management RFID tags are attached and recording the progress of the work in the database.

* * * * *